UNITED STATES PATENT OFFICE.

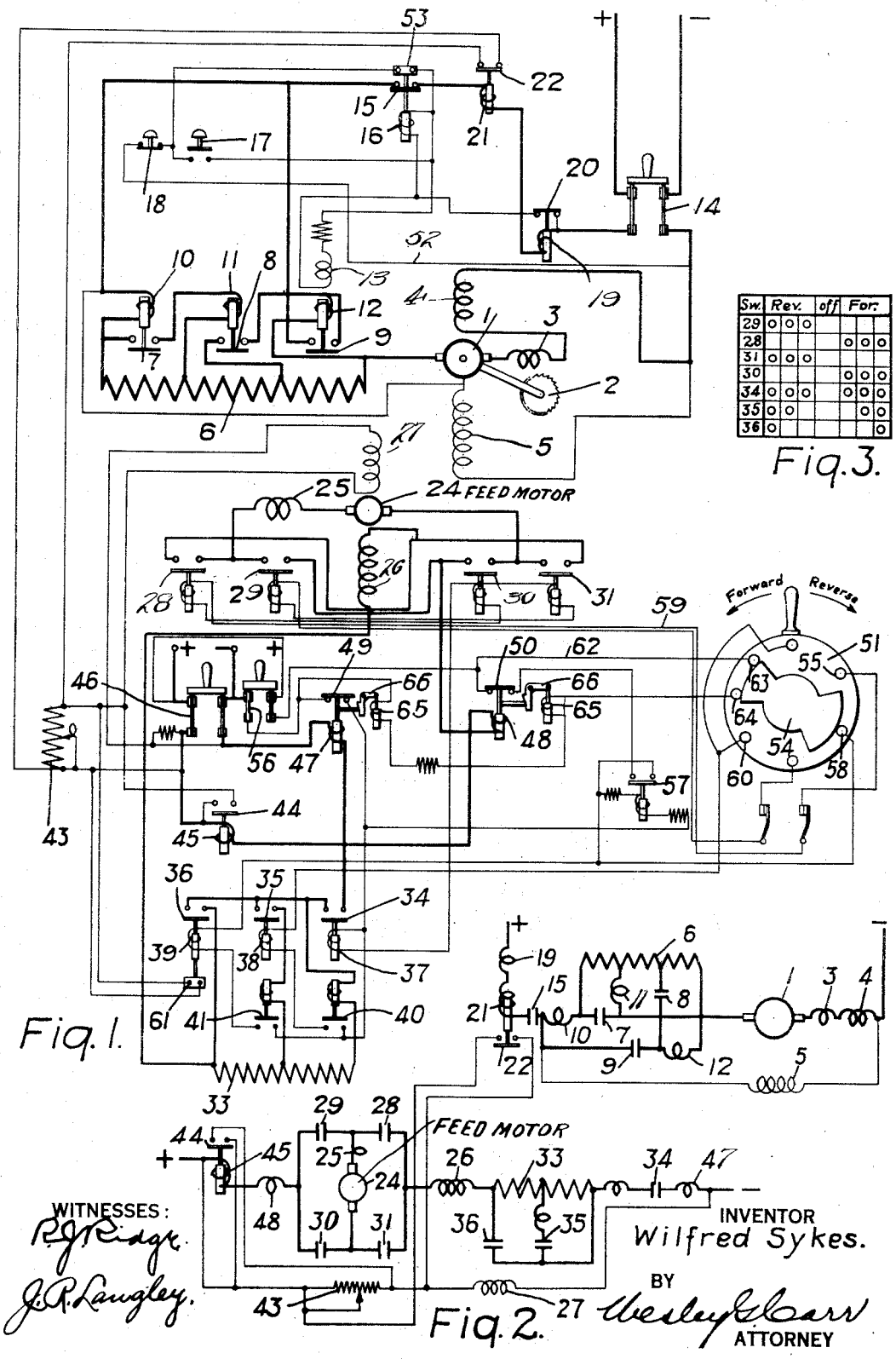

WILFRED SYKES, OF PITTSBURGH, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,368,369.     Specification of Letters Patent.     Patented Feb. 15, 1921.

Application filed December 14, 1915. Serial No. 66,734.

*To all whom it may concern:*

Be it known that I, WILFRED SYKES, a subject of the King of Great Britain, and a resident of Pittsburgh, in the county of Allegheny and State of Pennsylvania, have invented a new and useful Improvement in Motor-Control Systems, of which the following is a specification.

My invention relates to motor-control systems and has particular reference to systems for controlling electric motors that are employed in connection with saws and similar machines.

My invention has for its object to provide a simple and efficient means whereby electric motors that are employed in connection with machines for operating upon materials of varying thickness may be automatically controlled to operate under substantially constant loads.

In the operation of motor-driven saws that are employed for cutting products of various kinds, as, for example, rods or beams of steel, it is common practice to employ a small adjustable-speed motor for controlling the rate at which the material is advanced or fed to the saw. When the material to be cut is of varying thickness, the maximum speed for which the auxiliary or feed motor may be adjusted must be such as may be safely employed in cutting the material at its line of maximum thickness. For example, in cutting an I-beam, the speed of the feed motor must correspond to that adapted for cutting each of the flanges. It will be obvious that this speed is much less than that essential for efficient operation in cutting the web or intermediate portion of the beam.

In order to avoid the defects of the arrangement described above, I provide a system whereby the speed of the feed motor is dependent upon the load upon the main or saw motor. The speed of the feed motor is governed by a relay of the well known fluttering type which controls the field excitation of the feed motor in accordance with the value of the current traversing the circuit of the saw motor. By means of this arrangement, the load upon the saw motor may be maintained substantially constant, and the maximum production of the mechanism may be obtained. The rate of acceleration of the feed motor is dependent upon the current traversing its circuit, a second field relay controlling its field excitation in the same manner as that described above in connection with the load upon the saw motor.

In the accompanying drawing, Figure 1 is a diagrammatic view of circuits and apparatus embodying my invention. Fig. 2 is a view, similar to Fig. 1, of a schematic arrangement of the system of Fig. 1. Fig. 3 is a diagrammatic view illustrating the sequence of the switches for controlling the circuits of the feed motor.

An electric motor 1, which may be employed to drive a saw 2, has a compensating field winding 3, a series field winding 4, and a shunt field winding 5. A sectional starting resistor 6, which is in series with the armature of the motor 1, is controlled by a series of electromagnetic switches 7, 8 and 9. The switches are respectively provided with series actuating coils 10, 11 and 12, the coils 11 and 12 being respectively connected in series with the switches 7 and 8. The switch 9 is provided with a shunt holding coil 13 which insures that the switch 9 will not open in case the current traversing the motor circuit decreases to a relatively low value.

The motor circuits are controlled by a main switch 14 and a line switch 15 having a shunt actuating coil 16. The circuit of the coil 16 is controlled by a pair of push buttons 17 and 18 which are respectively adapted to start and stop the saw motor 1. The main circuit of the motor 1 comprises, also, the coil 19 of a series overload relay 20 and the coil 21 of a relay 22, the purpose of which is to be later described.

The load upon the main motor 1 is adapted to be controlled by an auxiliary or feed motor 24 which has a compensating field winding 25, a series field winding 26 and a shunt field winding 27. The direction of rotation of the motor 24 is controlled by reversing switches 28, 29, 30 and 31. A sectional starting resistor 33 is controlled by a series of electromagnetically operated switches 34, 35 and 36. The switches 34, 35 and 36 are respectively provided with shunt actuating coils 37, 38 and 39. The coils 38 and 39 are respectively connected in series with accelerating relays 40 and 41.

A resistor 43, which is in circuit with the shunt field winding 27, is controlled by a relay 44 having an actuating coil 45 in series with the armature of the motor 24. A shunt circuit for the resistor 43 is also controlled by the relay 22 which operates in accordance with the current traversing the circuit of the main motor 1. The main circuit of the motor 24 comprises a line switch 46 and the series actuating coils 47 and 48 of overload relays 49 and 50, respectively. The reversing switches and the accelerating switches 34, 35 and 36 are controlled by a controller 51.

In the operation of the mechanism, the saw motor 1 is placed in operation by closing push-button switch 17. Current then flows from the positive line conductor through one side of switch 14, overload relay 20, coil 16 of switch 15, push-button switches 17 and 18, conductor 52 and the other side of switch 14 to the negative line conductor. The coil 16 is energized to close the switch 15 and an interlocking switch 53 that is mechanically connected thereto.

The closing of switch 15 completes the armature circuit of the motor 1 which extends from the positive line conductor through coil 19 of overload relay 20, coil 21 of field relay 22, switch 15, coil 10, starting resistor 6, armature of motor 1, compensating field winding 3, and series field winding 4 to the negative line conductor. The coil 10 is energized by the circuit just described to close switch 7 and thereby complete a shunt circuit for a section of the starting resistor 6. This shunt circuit comprises coil 11 of switch 8 and the latter closes to complete a similar shunt circuit for a second section of the resistor which comprises coil 12 of switch 9. The switch 9 then closes to complete a shunt circuit for the entire resistor 6. The saw motor 1 then operates at its normal speed.

The material to be cut is then advanced to the saw 2 by means of the feed motor 24. The controller arm is actuated to the left, as viewed in Fig. 1, to effect the engagement of the conducting member 54 of the controller with a contact finger 55. Current then traverses a circuit extending from the positive line conductor through one side of control switch 56, overload relay 50, no-voltage relay 57, contact finger 58, conducting member 54, contact finger 55, conductor 59, actuating coils of reversing switches 28 and 30, coil 37 of accelerating switch 34, overload relay 49 and the other side of switch 56 to the negative line conductor.

The several coils included in the circuit traced above are energized to close the reversing switches 28 and 30 and the switch 34. Current then traverses the armature circuit of the feed motor 24 which extends from the positive conductor through one side of switch 46, coil 45 of field relay 44, coil 48 of overload relay 50, reversing switch 30, armature of motor 24, compensating field winding 25, reversing switch 28, series field winding 26, starting resistor 33, switch 34, coil 47 of overload relay 49 and the other side of switch 46 to the negative line conductor.

In the second position of the controller, the conducting member 54 engages contact finger 60 to complete a circuit that extends from the conducting member 54, which is connected to the positive side of the line through contact finger 58, through contact finger 60, coil 38 of accelerating switch 35, current-limit relay 40 and overload relay 49 to the negative line conductor. The closing of switch 35 operates to shunt a section of starting resistor 33 and thereby increase the speed of the motor 24.

When the accelerating relay 41 has closed, subsequent to the closing of switch 35, the coil 39 is energized to close switch 36 and thereby complete a shunt circuit for the entire starting resistor 33 to further accelerate the motor. The closing of switch 36 operates to open an interlock switch 61 which is mechanically connected thereto. The interlock switch 61 controls a shunt circuit for the resistor 43 which is in circuit with the shunt field winding 27 of the feed motor 24. This arrangement insures a strong field during the acceleration of the motor by cutting out armature resistance.

Should the current traversing the armature circuit of the feed motor exceed a predetermined value, coil 45 is energized to close switch 44 and thereby complete a shunt circuit for resistor 43 to strengthen the field of the motor and thereby increase its counter electromotive force. The switch 44 operates as a fluttering relay to gradually accelerate the motor until its speed is such that the resistor 43 may remain in circuit with the shunt field winding 27.

Should the material to be cut be advanced to the saw 2 at such rate that the load upon the saw motor 1 reaches a predetermined value, coil 21 of field relay 22 is sufficiently energized to close relay 22 and thereby complete a shunt circuit for the field resistor 43 of feed motor 24. The resultant strengthening of the field of the latter motor decreases the speed at which it is operating and, accordingly, the rate at which the material to be cut is advanced to the saw. The switch 22 remains in its closed position to decrease the speed of the feed motor 24 during such time as the load upon the saw motor 1 exceeds the predetermined value. The switch 22 continues to oscillate so long as the current traversing the circuit of the main motor tends to exceed the predetermined value at which the switch 22 is arranged to close.

To stop the motor 24, the controller arm is actuated to its illustrated or "off" position to open the circuits of the actuating coils of reversing switches 28 and 30 and accelerating switches 34 and 35 and thereby open the armature circuit of the motor. The return of the controller to its illustrated position completes a circuit extending from the positive line conductor through conductor 62, contact finger 63, contact member 54, contact finger 64 and coils 65 of electromagnetic latches 66 for overload relays 49 and 50 to the negative line conductor. The electromagnetic latches 66 are provided in order to prevent the closing of the overload relays to complete the motor circuit after an excessive current has been traversing it until the controller is brought to its "off" position. The material may be withdrawn from the saw by actuating the controller arm to the right and thereby reversing the motor 24.

It will be noted that I have provided an arrangement whereby the speed of an auxiliary or controlling motor is dependent upon, and controlled in accordance with, the load upon a main or working motor. The material to be operated upon is fed or advanced to the operating machine at such a rate that the load upon the main motor is maintained substantially constant, and the output of the machine is maintained at a substantially maximum rate. A system arranged in accordance with my invention operates with high efficiency since the main motor is at all times supplied with a full load.

While I have shown my arrangement as adapted for use in connection with saws, it will be obvious that the principle embodied therein is applicable to other machines in which similar conditions obtain. Many modifications may occur to those skilled in the art to which my invention appertains. It is understood that such changes may be made as fall within the scope of the appended claims without departing from the spirit of my invention.

I claim as my invention:

1. In a system of motor control, the combination with a main motor and an auxiliary motor having a field-magnet winding, of a resistor in circuit with said winding and means for shunting said resistor in accordance with the value of the currents traversing the circuits of said motors.

2. In a system of motor control, the combination with a main motor and an auxiliary motor having a field-magnet winding, of a resistor in circuit with said winding and a pair of relays respectively in circuit with said motors and operable at predetermined values of the currents traversing said circuits to shunt said resistor.

3. In a system of motor control, the combination with a main motor and an auxiliary motor for controlling the load upon the main motor, of means for controlling the speed of the auxiliary motor in accordance with the current conditions in the circuit of the auxiliary motor.

4. In a system of motor control, the combination with a pair of electric motors, one of which controls the load upon the other, of means comprising current-limit devices for controlling the speed of one of said motors in accordance with the values of the currents traversing the respective circuits of said motors.

5. In a system of motor control, the combination with a pair of electric motors, one of which controls the load upon the other, of means for controlling the speed of said one motor in accordance with the values of the currents traversing the respective circuits of said motors.

6. In a system of motor control, the combination with a saw, an electric motor for driving the same, and a second motor for advancing material to said saw, said second motor having a field-magnet winding and a resistor in circuit therewith, of automatic means for maintaining a substantially constant load upon the main motor, said means comprising two current-limit devices respectively controlled in accordance with the values of the currents traversing the circuits of said motors for shunting said resistor.

In testimony whereof, I have hereunto subscribed my name this 30th day of Dec., 1915.

WILFRED SYKES.